(12) United States Patent
Besquin et al.

(10) Patent No.: US 11,973,530 B1
(45) Date of Patent: Apr. 30, 2024

(54) LOW LATENCY OFF-GRID COMMUNICATION SYSTEM WITH NETWORK OPTIMIZATION AND LOW ENERGY SIGNAL TRANSMISSION CAPABILITIES

(71) Applicant: SomeWear Labs, Inc., San Francisco, CA (US)

(72) Inventors: Alan Besquin, San Francisco, CA (US); James Kubik, Chicago, IL (US); Diego Lozano Trevino, Chicago, IL (US); Braden Young, San Francisco, CA (US); Rachel Carandang, San Francisco, CA (US)

(73) Assignee: SOMEWEAR LABS, INC., San Francisco, CA (US)

( * ) Notice: Subject to any disclaimer, the term of this patent is extended or adjusted under 35 U.S.C. 154(b) by 0 days.

(21) Appl. No.: 18/136,705

(22) Filed: Apr. 19, 2023

(51) Int. Cl.
*H04B 1/69* (2011.01)
*H04W 72/56* (2023.01)

(52) U.S. Cl.
CPC .............. *H04B 1/69* (2013.01); *H04W 72/56* (2023.01); *H04B 2001/6912* (2013.01)

(58) Field of Classification Search
CPC .. H04B 1/69; H04B 2001/6912; H04W 72/56
See application file for complete search history.

(56) References Cited

U.S. PATENT DOCUMENTS

| | | | |
|---|---|---|---|
| 9,015,335 B1* | 4/2015 | Gigliotti | H04L 65/80 348/415.1 |
| 9,049,985 B2 | 6/2015 | Feher | |
| 9,369,832 B1 | 6/2016 | Noble et al. | |
| 9,544,737 B2 | 1/2017 | Rudow et al. | |
| 9,544,749 B1 | 1/2017 | Hoffman et al. | |
| 9,578,453 B2 | 2/2017 | Noble et al. | |
| 9,723,653 B2 | 8/2017 | Shikowitz | |
| 9,825,357 B2 | 11/2017 | Parsche | |
| 9,825,373 B1 | 11/2017 | Smith | |
| 9,924,424 B2 | 3/2018 | Chuberre et al. | |
| 9,980,113 B2 | 5/2018 | Miner et al. | |
| 10,110,463 B2 | 10/2018 | Reis | |
| 11,025,439 B2 | 6/2021 | Theodore et al. | |
| 11,232,685 B1* | 1/2022 | Nixon | H04N 23/60 |
| 11,258,471 B2 | 2/2022 | Boghrat et al. | |
| 2014/0196025 A1* | 7/2014 | Corinella | G06F 8/61 717/178 |
| 2018/0084017 A1* | 3/2018 | Borges | H04L 65/1089 |
| 2020/0021669 A1* | 1/2020 | Bikumala | H04W 4/70 |

(Continued)

*Primary Examiner* — Chi H Pham
*Assistant Examiner* — Raul Rivas
(74) *Attorney, Agent, or Firm* — NEO IP

(57) ABSTRACT

A system includes a network node device operable to dynamically connect to different networks and different types of networks based on factors including latency and noise levels in each network. The system allows for low power transmission of data packets as well as obfuscation of transferred data packets by splitting packets for a single file across multiple nodes in a mesh network, where the mesh network then recombines the signals to externally convey the data. The system leverages the use of LoRa communication across one or more networks to communicate critical data, such as location data for particular devices, at long ranges with minimized risk of detection.

20 Claims, 9 Drawing Sheets

(56) References Cited

U.S. PATENT DOCUMENTS

| | | | |
|---|---|---|---|
| 2020/0092675 A1 | 3/2020 | Cook et al. | |
| 2021/0243565 A1 | 8/2021 | Stark et al. | |
| 2021/0320941 A1* | 10/2021 | e Silva | H04L 63/1433 |
| 2021/0367661 A1 | 11/2021 | Ravishankar et al. | |
| 2022/0132396 A1 | 4/2022 | Crouthamel et al. | |
| 2022/0182129 A1* | 6/2022 | Guter | H04W 84/18 |
| 2022/0256631 A1 | 8/2022 | Jain et al. | |
| 2022/0329522 A1 | 10/2022 | Maciocco et al. | |
| 2022/0345261 A1* | 10/2022 | Ali | H04L 5/0096 |
| 2022/0394004 A1 | 12/2022 | Katis et al. | |
| 2023/0208894 A1* | 6/2023 | Iitsuka | H04L 65/4015 709/204 |

* cited by examiner

LOW LATENCY OFF-GRID COMMUNICATION SYSTEM WITH NETWORK OPTIMIZATION AND LOW ENERGY SIGNAL TRANSMISSION CAPABILITIES

BACKGROUND OF THE INVENTION

1. Field of the Invention

The present invention relates to network prioritization and switching systems, and systems constructing mesh networks of mobile node devices, having the ability to selectively connect to an optimal network and/or divide packets sent to different nodes for optimizing signal delivery speed, minimizing signal delivery cost, or signal obfuscation.

2. Description of the Prior Art

It is generally known in the prior art to provide devices, such as smartphones, able to switch between WI-FI and cellular networks in order to optimize data transmission speed or minimize latency. This capability, often known as a smart network switch, typically periodically checks if WI-FI internet connection is stable and, if the check fails, then the device is automatically switched to use cellular data. Some systems will then periodically check if a WI-FI has been established and then switch back to using a WI-FI network once stabilized.

It is further known to use diversity transmission schemes to allow data to be sent along multiple signal paths while avoiding multipath distortion issues, including in wireless mesh networks.

Prior art patent documents include the following:

US Patent Publication No. 2022/0329522 for Adaptive resilient network communication by inventors Maciocco et al., filed Jun. 29, 2022 and published Oct. 13, 2022, discloses systems and methods for adaptive resilient network communication. A system may monitor network traffic on multiple pathways between user equipment and an application or a service at a network destination, gather network telemetry data from the monitored network traffic, input the network telemetry data into a trained artificial intelligence model, and classify the network telemetry data using the model. The system may further determine, using the model, an anomaly condition in at least a portion of the multiple pathways, and in response to the determination of an anomaly, select a mitigation technique for the at least a portion of the multiple pathways.

US Patent Publication No. 2022/0256631 for Methods and apparatus to switch between wireless networks by inventors Jain et al., filed Feb. 7, 2022 and published Aug. 11, 2022, discloses techniques for selecting cellular and satellite networks. An example method for switching between communication networks includes receiving one or more signals via a first wireless communication network with a mobile device, determining a second wireless communication network is available based at least in part on a location of the mobile device and a time, detaching the mobile device from the first wireless communication network at the time if the second wireless communication network is available, and receiving one or more signals from the second wireless communication network with the mobile device after the time.

U.S. Pat. No. 9,924,424 for Integrated radio communications system using an ordered hierarchical cellular coverage by inventors Chuberre et al., filed Feb. 10, 2017 and issued Mar. 20, 2018, discloses an integrated radio communication system with ordered hierarchical cellular coverage comprises a first system and a second system, the coverage of the second system covered by the coverage of the first system, and a set of dual-mode terminals that can selectively use the first system or the second system. The first and second systems are configured to simultaneously share a common portion Bc of a first band B1 of frequencies respectively on a first uplink and a second uplink, and respectively manage first transmission resources and corresponding second transmission resources. The second radio communication system of lower level N2 is free to manage its second transmission resources without any coordination constraint with respect to the first system of higher level N1, whereas the first system of higher level is configured to not disturb the second system in the common frequency band portion. The first system is configured to transmit data packets on a first uplink random access contention channel and to manage its first resources optimally in terms of transmission capacity of the channel as a function of the measurement of the occupancy of the second radio resources currently used by the second system and of the first resources currently used by the first system.

US Patent Publication No. 2022/0394004 for Telecommunication and multimedia management method and apparatus by inventors Katis et al., filed Jun. 12, 2014 and published Dec. 8, 2022, discloses a telecommunication and multimedia management apparatus and method that supports voice and other media communications and that enables users to: (i) participate in multiple conversation modes, including live phone calls, conference calls, instant voice messaging or tactical communications; (ii) review the messages of conversations in either a live mode or a time-shifted mode and to seamlessly transition back and forth between the two modes; (iii) participate in multiple conversations either concurrently or simultaneously; (iv) archive the messages of conversations for later review or processing; and (v) persistently store media either created or received on the communication devices of users. The latter feature enables users to generate or review media when either disconnected from the network or network conditions are poor and to optimize the delivery of media over the network based on network conditions and the intention of the users participating in conversations.

US Patent Publication No. 2022/0132396 for System and method of a satellite-enabled mobile gateway device by inventors Crouthamel et al., filed Nov. 22, 2021 and published Apr. 28, 2022, discloses mobile gateway devices for connecting to a wireless mesh network having a plurality of nodes include a wireless radio module structured to communicate with the plurality of nodes via the wireless mesh network, wherein the plurality of nodes includes at least one instrument to collect information; and a computer structured to: receive the information from the plurality of nodes via the wireless radio module; and transmit the information to a remote server via a satellite connection.

U.S. Pat. No. 9,578,453 for Method of sending destination and current locations from a mobile device to a central viewing location by inventors Noble et al., filed Feb. 13, 2015 and issued Feb. 21, 2017, discloses a method of transmitting a destination along with the user's current location to a central viewing site allowing the user set or change their travel plan while they are on their trip and minimize bandwidth use on expensive or slow networks. A byproduct of this method is the transmission device can record the detailed path traveled by the user while transmitting enough user locations to give the viewer at the central viewing site a good indication of where the user has been. The detailed route traveled by the user is uploaded to the central viewing site when the transmission device is connected to a faster or less expensive network.

US Patent Publication No. 2021/0243565 for Object tracking systems and methods by inventors Stark et al., filed Feb. 9, 2021 and published Aug. 5, 2021, discloses systems, methods, and computer-readable media for object tracking. An example method may include receiving satellite signals from GPS satellites. The satellite signals may be indicative of satellite locations associated with the one or more GPS satellites and satellite timestamps associated with respective satellite locations. The method may further include determining, based on the satellite signals, a first location associated with a first tracking device. The method may further include receiving a target location associated with a target via a satellite transmission. The method may further include sending the target location to a second tracking device via a mesh network. The method may further include determining that a first distance between the first location and the target location, and the method may further include determining, based on the first distance, one or more actions.

US Patent Publication No. 2021/0367661 for Next Generation Mobile Satellite Service (MSS) by inventors Ravishankar et al., filed May 20, 2021 and published Nov. 25, 2021, discloses a system and method for operating a hybrid 4G satellite network. The method includes providing a NGSG including a satellite AS/NAS stack, a terrestrial 4G stack and a relay to connect the satellite AS/NAS stack and the terrestrial 4G stack; transporting a 4G traffic between a 4G UE and the NGSG using a satellite air interface; utilizing a terrestrial network between the NGSG and a 4G CN to transport the 4G traffic; and mapping, with the relay, the 4G traffic between the satellite AS/NAS stack and the terrestrial 4G stack and vice versa, where the satellite air interface is better suited for satellite communications than the terrestrial network. A system and method for multiplexing a first-generation UE and a second-generation UE on a satellite channel.

U.S. Pat. No. 9,369,832 for Method and system for remotely tracking multiple assets and updating team data by inventors Noble et al., filed Apr. 11, 2013 and issued Jun. 14, 2016, discloses a method for "team tracking" delivers position updates for multiple team members using a telecommunications network. Each team member/user carries a handheld and field-portable tracking and messaging device (TMD) that is used to send the current position of the device user to a networked server. The TMD has a built-in GPS receiver which provides the current position coordinates of the user. This position data is periodically transmitted via the telecommunications network to a central server. Team Status Messages (TSM) are sent regularly to each team member, the TSM containing the last known position of each team member. The position data are displayed over a map background, so that each member can see the positions of the other members. When tracking a target, a route is mapped to the target. If the target changes location, the next TSM that is sent indicates a re-calculated map to the target.

U.S. Pat. No. 9,980,113 for Emergency communications from a local area network hotspot by inventors Miner et al., filed Jan. 9, 2017 and issued May 22, 2018, discloses a request to initiate emergency communications is received at a wireless local area network hotspot. A number of mobile communication devices connected to the wireless local area network hotspot and location information of the wireless local area network hotspot are determined. A distress message is generated that includes the number of mobile communication devices connected to the wireless local area network hotspot and the location information. The distress message is transmitted to a contact address for an emergency contact.

U.S. Pat. No. 11,258,471 for Integrative software radio by inventors Boghrat et al., filed Dec. 13, 2019 and issued Feb. 22, 2022, discloses an integrative software radio embodying a single multi-radio device including functionalities that are a superset of a plurality of individual discrete radio devices including a radio frequency transmitter that integrates transmission capabilities of a plurality of discrete transmitters such that the radio frequency transmitter is configured to generate a first amalgamated waveform that is a combination of individual waveforms, each individual waveform corresponding to the transmission capabilities of its respective one of the plurality of discrete transmitters, wherein the transmission capabilities each of the plurality of discrete transmitters comprise operating characteristics different from one or more of the other discrete transmitters, wherein a waveform of a discrete transmitter comprises an adjustable electromagnetic wavefront and a proprietary waveform generation component; and a mission module communicatively coupled to the plurality of discrete transmitters and configured to alter the wavefront of at least one of the plurality of discrete transmitters to reduce interference among the at least one of the plurality of discrete transmitters without adjusting the proprietary waveform generation component.

U.S. Pat. No. 9,544,749 for Apparatus for emergency communications using dual satellite communications systems for redundancy and a means of providing additional information to rescue services to support emergency response by inventors Hoffman et al., filed Nov. 3, 2015 and issued Jan. 10, 2017, discloses a method and apparatus for emergency communications using dual satellite communication systems for redundancy and a means of providing additional information to rescue services support emergency response. The system combines the Cospas-Sarsat emergency system for 406 beacons with a secondary means of distress alerting over a commercial satellite system as well as permitting the government agencies responsible for emergency services to directly interface with the person in distress to know about his/her location and to communicate with him or her to resolve the emergency in the best possible way.

U.S. Pat. No. 9,049,985 for Satellite, cellular and Wi-Fi mobile multimode transmission and reception methods by inventor Fehrer, filed Jan. 16, 2012 and issued Jun. 9, 2015, discloses an airplane based communication and position finding method for receiving in a transceiver a OFDM signal from a mobile unit in an airplane. Demodulating and processing an OFDM received signal into a processed OFDM signal and processing and modulating the processed OFDM signal into a processed modulated signal. Transmitting in the airplane based transceiver the modulated signal to a satellite receiver. Receiving in the airplane based transceiver a second modulated signal from a satellite transmitter, demodulating and processing the second modulated signal into a processed second OFDM signal and modulating and transmitting said processed second OFDM signal to mobile unit. Method for processing an input voice signal, in a mobile unit, into a processed cross-correlated CDMA signal, modulating and transmitting cross-correlated CDMA signal into a modulated transmitted CDMA signal, used in a cellular system.

US Patent Publication No. 2020/0092675 for Mobile WiFi Network by inventors Cook et al., filed Apr. 24, 2019 and published Mar. 19, 2020, discloses a method, computer-readable medium, and system for managing a dynamic wireless network. An aspect of the invention is to identify the occurrence of an overlap of coverage areas provided by separate wireless access points, at least one of which is mobile.

U.S. Pat. No. 10,110,463 for Personal communications device for multiple communications systems by inventor Reis, filed Sep. 10, 2013 and issued Oct. 23, 2018, discloses a portable communications device (PCD) for communications with two or more communications systems including a power unit, a transceiver unit and a control unit. The power unit is for powering the communications device so as to enable it to be portable. The transceiver unit includes a local unit for communicating with a local communications system and a satellite unit for communicating with a satellite communications system. The control unit is for controlling communications by the local unit and the satellite unit. The control unit includes a sensing algorithm for sensing requests for communications, a selection algorithm for automatically selecting the local unit or the satellite unit for communications. A software controlled transceiver unit is used together with parameter algorithms for automatically controlling communications and modifying the system budget.

U.S. Pat. No. 9,723,653 for Intelligent heterogeneous, mobile, Ad-Hoc communication network by inventor Shikowitz, filed Aug. 25, 2014 and issued Aug. 1, 2017, discloses a Mobile Ad Hoc Network that possesses sufficient intelligence to handle a collection of devices that differ in terms of features either inherent to the device or the environment in which they operate. The different features inherent to the device may consist of different hardware and software technologies (e.g., combination of RF for transmission ability, processing ability, power supply, and interfaces). The different features of the environment may consist of any telemetry data measuring the state of the environment, as well as information regarding the MANet such as the density of devices in the vicinity of a device.

U.S. Pat. No. 9,544,737 for Performing data collection based on external raw observables using a mobile data collection platform by inventors Rudow et al., filed Oct. 15, 2014 and issued Jan. 10, 2017, discloses an image that includes a point of interest being captured using an image capturing device that is an integral part of the mobile data collection platform. Raw observables are obtained from a GNSS raw observables provider that is external to and coupled with the mobile data collection platform. A position fix of the mobile data collection platform is determined based on the raw observables where the position fix is a location of an antenna. A location of an entrance pupil is calculated as an offset from the location of the antenna. Orientation information comprising a tilt angle and an azimuth angle is determined. The position fix and the orientation information are associated with a three dimensional location of the mobile data collection platform when the image was captured. Scale information is captured. The image, the position fix, the scale information, and the orientation information are stored in hardware memory of the mobile data collection platform.

U.S. Pat. No. 11,025,439 for Self-organizing mobile peer-to-peer mesh network authentication by inventors Theodore et al., filed Aug. 17, 2018 and issued Jun. 1, 2021, discloses a plurality of authentication devices form and manage a self-organizing mobile peer-to-peer mesh network to provide robust authentication of mobile peers, humans and or mobile devices such as drones, cars, satellites, robots etc. The mesh network may supplement traditional fixed point of entry authentication to combat social engineering penetrations or be used in situations where fixed-point authentication is not viable. Network efficiency can be enhanced by using two-level encryption, a first level of encryption based on permissions to join a mesh network and a simpler second level of encryption based on knowledge shared with members of the network for communication. Making the permissions a function of location can make the network more robust. Re-authenticating member peers based on the occurrence of defined events can further enhance security.

U.S. Pat. No. 9,825,373 for Monopatch antenna by inventor Smith, filed Sep. 15, 2015 and issued Nov. 21, 2017, discloses a monopatch antenna system including a ground plane, a patch antenna arranged parallel to the ground plane and having an aperture, and a monopole antenna extending perpendicularly to the ground plane through the aperture in the patch antenna. A feed system supplies a first portion of an RF signal to the patch antenna with a substantially circular polarization and simultaneously supplies a second portion of the RF signal to the monopole antenna with a linear polarization to produce a wide-beam composite antenna beam pattern having both linear and circular polarizations of the RF signal.

U.S. Pat. No. 9,825,357 for Electronic device including patch antenna assembly having capacitive feed points and spaced apart conductive shielding vias and related methods by inventor Parsche, filed Mar. 6, 2015 and issued Nov. 21, 2017, discloses an electronic device including wireless communications circuitry and an antenna assembly coupled thereto. The antenna assembly may include a substrate, an electrically conductive layer defining a ground plane carried by the substrate, and an electrically conductive patch antenna element carried by the substrate and spaced from the ground plane. The patch antenna element may have a symmetric axis dividing the patch antenna element into first and second symmetric areas, and first and second feed openings in the first and second symmetric areas, respectively. The antenna assembly may also include first and second feed pads in the first and second feed openings, respectively, and first and second feed lines extending through the substrate and respectively coupling the feed pads to the wireless communications circuitry. Spaced apart conductive shielding vias may be coupled to the ground plane and may extend through the substrate surrounding the patch antenna element.

SUMMARY OF THE INVENTION

The present invention relates to network prioritization and switching systems, and systems constructing mesh networks of mobile node devices, having the ability to selectively connect to an optimal network and/or divide packets sent to different nodes for optimizing signal delivery speed, minimizing signal delivery cost, or signal obfuscation.

It is an object of this invention to intelligently switch networks used to transmit data through a network node device, especially for use for remote, secure applications.

In one embodiment, the present invention is directed to a system for communicating data over one or more networks, including a plurality of network node devices in communication with each other and constituting a mesh network, wherein each of the plurality of network node devices is operable to communicate with other network node devices using chirp spread spectrum-based communication, wherein the mesh network receives at least one data package from an external network, wherein the at least one data package is automatically split into a plurality of portions, wherein each of the plurality of portions is transmitted to a separate network node device within the mesh network, and wherein at least one of the plurality of network node devices in the mesh network reconstructs the at least one data package after receiving the plurality of portions from other network devices within the mesh network.

In another embodiment, the present invention is directed to a system for communicating data over one or more networks, including a plurality of network node devices in communication with each other and constituting a mesh network, wherein each of the plurality of network node devices is operable to communicate with other network node devices using chirp spread spectrum-based communication, wherein each of the plurality of network node devices are operable to communicate with at least one external network, wherein each of the plurality of network node devices are operable to switch which of the at least one external network each of the plurality of network node devices is connected to based on noise levels in connections between each of the plurality of network node devices and each of the at least one external network, and wherein the at least one of the plurality of network node devices in the mesh network transmits at least one data package to the at least one external network.

In yet another embodiment, the present invention is directed to a system for communicating data over one or more networks, including a plurality of network node devices in communication with each other and constituting a mesh network, wherein each of the plurality of network node devices is operable to communicate with other network node devices using chirp spread spectrum-based communication, wherein each of the plurality of network node devices are operable to communicate with at least one external network, wherein at least one of the plurality of network node devices in the mesh network transmits at least one data package to the at least one external network, and wherein the at least one of the plurality of network node devices transforms the at least one data package from a first file type to a second file type, wherein the second file type has a lower file size than the first file type, and wherein the amount of file size reduction is based on signal strength, latency and/or available bandwidth cost between the at least one of the plurality of network node devices and the at least one external network.

These and other aspects of the present invention will become apparent to those skilled in the art after a reading of the following description of the preferred embodiment when considered with the drawings, as they support the claimed invention.

DETAILED DESCRIPTION

Figure 1A:
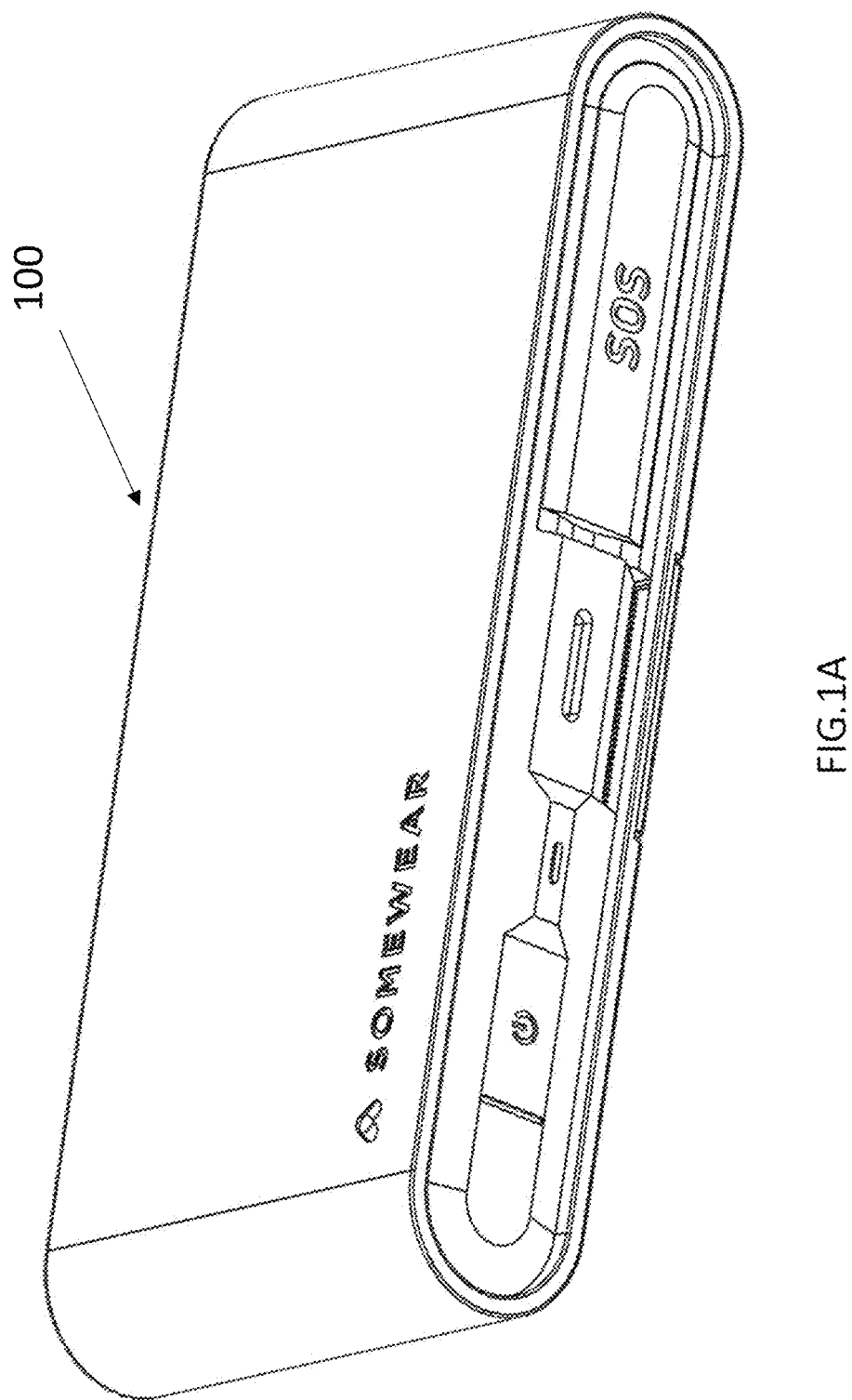
FIG. 1A illustrates an isometric view of a network node device according to one embodiment of the present invention.
Figure 1B:
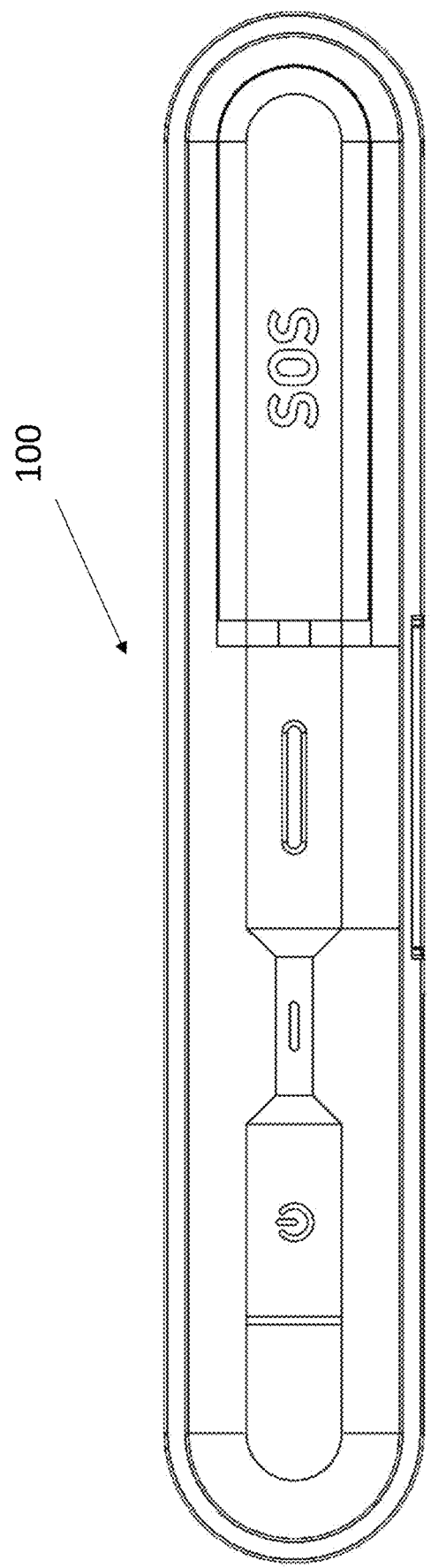
FIG. 1B illustrates a front orthogonal view of the network node device of FIG. 1A.
Figure 1C:
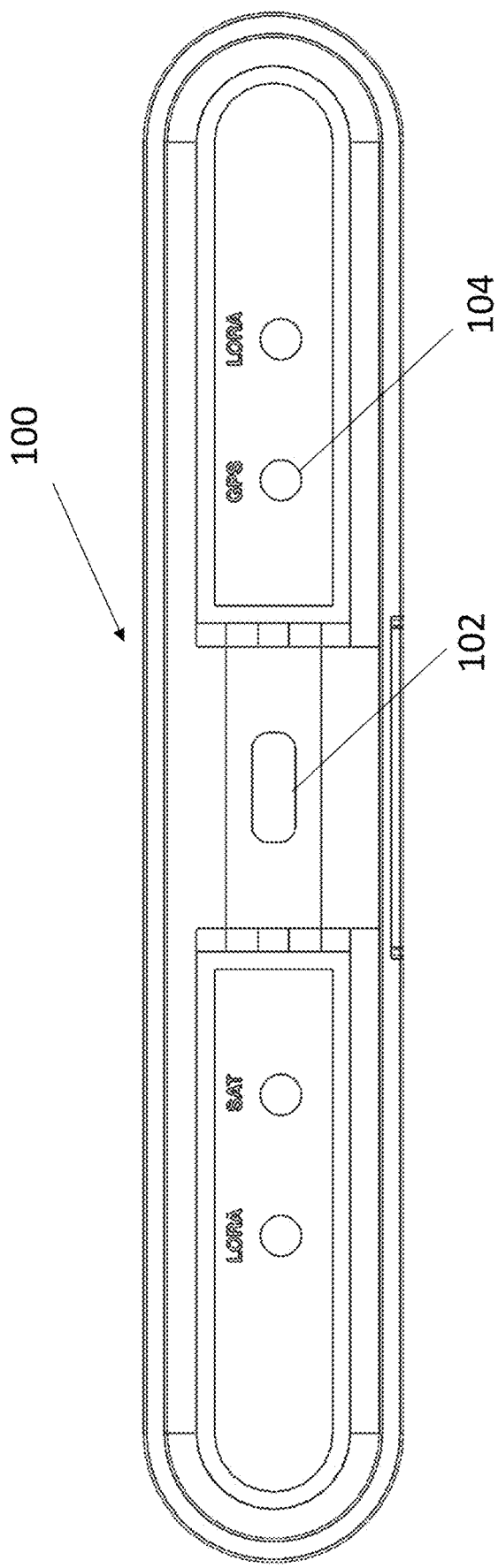
FIG. 1C illustrates a rear orthogonal view of the network node device of FIG. 1A.
Figure 1D:
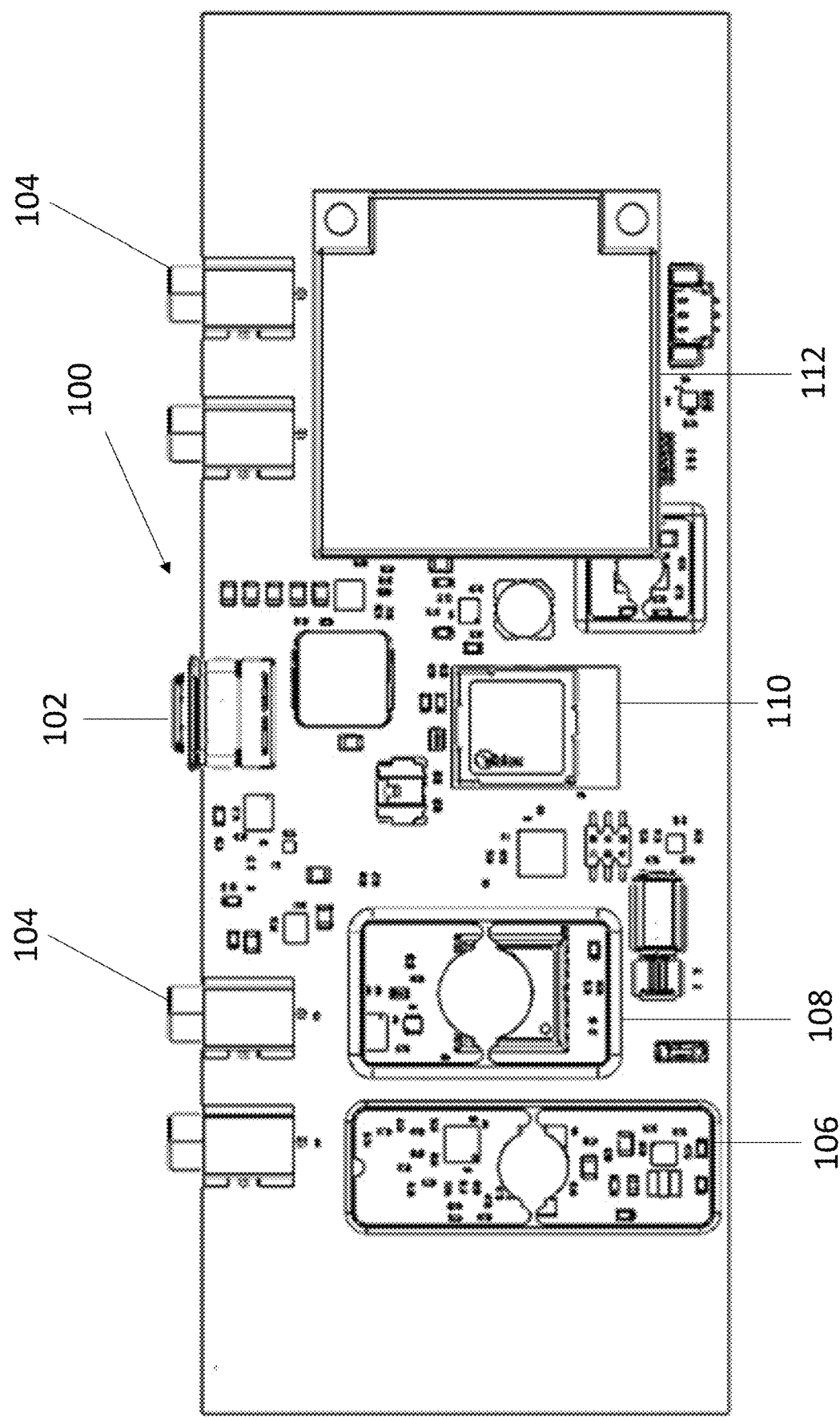
FIG. 1D illustrates a transparent view of the network node device of FIG. 1A.

The present invention is generally directed to network prioritization and switching systems, and systems constructing mesh networks of mobile node devices, having the ability to selectively connect to an optimal network and/or divide packets sent to different nodes for optimizing signal delivery speed, minimizing signal delivery cost, or signal obfuscation.

In one embodiment, the present invention is directed to a system for communicating data over one or more networks, including a plurality of network node devices in communication with each other and constituting a mesh network, wherein each of the plurality of network node devices is operable to communicate with other network node devices using chirp spread spectrum-based communication, wherein the mesh network receives at least one data package from an external network, wherein the at least one data package is automatically split into a plurality of portions, wherein each of the plurality of portions is transmitted to a separate network node device within the mesh network, and wherein at least one of the plurality of network node devices in the mesh network reconstructs the at least one data package after receiving the plurality of portions from other network devices within the mesh network.

In another embodiment, the present invention is directed to a system for communicating data over one or more networks, including a plurality of network node devices in communication with each other and constituting a mesh network, wherein each of the plurality of network node devices is operable to communicate with other network node devices using chirp spread spectrum-based communication, wherein each of the plurality of network node devices are operable to communicate with at least one external network, wherein each of the plurality of network node devices are operable to switch which of the at least one external network each of the plurality of network node devices is connected to based on noise levels in connections between each of the plurality of network node devices and each of the at least one external network, and wherein the at least one of the plurality of network node devices in the mesh network transmits at least one data package to the at least one external network.

In yet another embodiment, the present invention is directed to a system for communicating data over one or more networks, including a plurality of network node devices in communication with each other and constituting a mesh network, wherein each of the plurality of network node devices is operable to communicate with other network node devices using chirp spread spectrum-based communication, wherein each of the plurality of network node devices are operable to communicate with at least one external network, wherein at least one of the plurality of network node devices in the mesh network transmits at least one data package to the at least one external network, and wherein the at least one of the plurality of network node devices transforms the at least one data package from a first file type to a second file type, wherein the second file type has a lower file size than the first file type, and wherein the amount of file size reduction is based on signal strength, latency and/or available bandwidth cost between the at least one of the plurality of network node devices and the at least one external network.

When in remote locations, data transfer is particularly difficult due to distance from any cellular towers and lack of WI-FI (or other local network). Additionally, when in hostile environments, where secrecy is important, connection to public cellular or WI-FI networks provides a danger of data leakage or interception and of detection by potentially adverse parties. For this reason, communications in remote or hostile locations frequently rely on either satellite connections or high-power radio communications. However, both of these methods have drawbacks.

There are several different satellite networks, including IRIDIUM, which includes over 60 active satellites in low earth orbit that are used to transmit signals, allowing the satellites to be used primarily as a limited messaging (e.g., text messaging or SOS) network. STARLINK, on the other hand, includes a much greater number of satellites (in the 1000s) and provides a service more similar to internet coverage. Using purely satellite connections often means accepting low data transfer rates at much higher costs even when faster, lower cost networks are available (e.g., cellular). Satellite connections are also not always the most reliable, even in remote areas, especially if cloud coverage and weather interfere with the signals. Even if one were to switch between using these satellite networks and other networks, the data queue protocols used in networks such as IRIDIUM present unique challenges. For example, if a transmitting device tries to send 40 text messages and 10 images via a satellite network and these messages are then added to a queue, when the transmitting device enters the coverage area for a cellular network, it is able to send the first 20 of those text messages quickly via the cellular network before they have a chance to leave the satellite queue, after which the transmitting device exists the coverage area. In this situation, it is preferable to clear those 20 text messages from the queue, such that duplicates are not sent and extra satellite data is not used, while retaining the remainder of the text messages and image files in the queue. However, with networks such as IRIDIUM, the only options are to leave the queue alone or clear the entirety of the queue, providing great inconvenience. Therefore, any system of switching networks is preferably able to selectively remove messages or particular data packets from a queue.

High power radio devices, on the other hand, are often bulky, use large amounts of power (and therefore require large batteries or else have short battery life), and, most importantly, are easily detectable by potentially adverse parties. Short battery life is particularly onerous in a hostile environment, where access to new batteries or the ability to charge batteries is unlikely to be safely available. While high power radio includes several drawbacks, lower power, less detectable systems with sufficient reliability have not yet risen to take its place.

However, when operating in a remote environment, the issues are not able to be confined to a singular device itself connecting to a network, but include a wider issue of each of the devices in the network being connected. This is particularly an issue if the network includes a centralized backhaul node. If such a node either exits the range of the network or is otherwise disabled (e.g., malfunctions or is destroyed), the integrity of the network as a whole is compromised. Therefore, it is preferable for such a remote network to be configured as a less centralized mesh network to improve stability even in the event that particular node devices are no longer operable.

Referring now to the drawings in general, the illustrations are for the purpose of describing one or more preferred embodiments of the invention and are not intended to limit the invention thereto.

In one embodiment, the present invention includes a plurality of network node devices that collectively form a mesh network. The mesh network preferably transmits signals between network nodes via LoRa, with the individual network node devices connected to user devices via BLUETOOTH LOW ENERGY and configured such that each network node device in the network acts as external network backhauls (e.g., satellite backhauls, cellular backhauls, etc.), without a single central backhaul node. This allows the system to exhibit extremely high resilience, even if individual node devices drop out of the network. These signals also allow for transmission of data regarding the connectivity of individual node devices to networks outside of the mesh, such as satellite networks or cellular networks, in order to provide the status of each node device. The mesh network is able to transmit or receive signals via the other networks, such as the satellite or cellular networks, to or from external sources. In one embodiment, which external network is used to transmit data is determined, in real time, by the network node device transmitting the data based on characteristics of connectivity to each network, including, but not limited to, signal strength, latency, cost, signal-to-noise ratio, and/or other network characteristics.

FIGS. 1A-1D illustrate a network node device according to one embodiment of the present invention. The network node device is operable to connect or pair with at least one user device (e.g., a smart phone, a tablet, a computer, a smart watch, etc.) such that it is able to receive data or commands from the at least one user device and transmit data to the at least one user device. In one embodiment, the network node device pairs with the at least one user device via a BLUETOOTH signal and/or any other method of pairing devices known in the art. The network node device is also able to receive signals over a first network (e.g., a satellite network, a cellular network, etc.) and transmit corresponding signals to other network node devices within a mesh network. In one embodiment, the mesh network is configured as a wireless local area network (WLAN) (e.g., WI-FI) or a wireless personal area network (WPAN) for transmission to at least one user device. The network node device is then also operable to receive signals from the at least one user device or from other network node devices over the mesh network and transmit those signals over the cellular and/or satellite network. In one embodiment, the WPAN includes at least one BLUETOOTH network. In one embodiment, the at least one BLUETOOTH network includes a BLUETOOTH LOW ENERGY network. The use of the network node device enables the system to leverage any number of network types, including WLAN, WPAN, cellular networks, satellite networks, and radiofrequency networks (e.g., higher powered radio and low-powered radio) over which to communicate data, enabling use in both remote areas and higher density areas, for improving network resilience, improving data transfer speeds, minimizing cost, and/or reducing signal footprint, depending on the particular use case.

In one embodiment, the network node device includes at least one processor, at least one memory, at least one printed circuit board (PCB), and at least one antenna. In one embodiment, the network node device includes at least one internal battery. In one embodiment, the at least one antenna includes at least one patch antenna. In one embodiment, the network node device includes one or more internal antennas, wherein each antenna is board mounted on the at least one PCB. In one embodiment, the one or more internal antennas include ceramic antennas or the one or more internal antennas are each ceramic antennas. The use of board mounted ceramic antennas allows the network node device to maintain a small form factor while still providing enough antenna sensitivity to serve the required functions for the system to operate. In one embodiment, the network node device 100 includes at least one port 104 for connecting to at least one external antenna. In one embodiment, the at least one port 104 includes at least four ports. In one embodiment, the at least one port 104 includes at least one micro coaxial connector (MCX) port.

In one embodiment, the network node device includes at least two LoRa radios (or transceivers) 106. In one embodiment, the at least two LoRa radios 106 are capable of carrying different types of data at different data rates. For example, in one embodiment, a first LoRa radio 106 utilizes higher data rates and is configured to transmit voice and other audio data, which utilize relative more bandwidth. A second LoRa radio (not shown) utilizes lower data rates and is able to send lower bandwidth signals, such as text data or geolocation coordinates. In one embodiment, the at least two LoRa radios 106 transmit signals at different frequency ranges. In another embodiment, a first LoRa radio 106 is used to facilitate private communication channels between two individual nodes within the mesh network, while the second LoRa radio is used as the main channel for communicating with the wider mesh network, allowing a private channel without causing noise or data loss on the main channel. For example, in one embodiment, a first LoRa radio 106 transmits data in a frequency range of 902-928 MHz and a second LoRa radio transmits data in a frequency range of 863 to 870 MHz. In one embodiment, each of the at least two LoRa radios 106 are capable of adjusting the data rates used for transmissions, trading off higher data rates for shorter ranges, depending on the situation. In one embodiment, the at least two LoRa radios 106 include SX1262 LoRa Connect transceivers.

In one embodiment, the network node device includes at least one microcontroller 110. In one embodiment, the at least one microcontroller 110 includes at least one dual core (i.e., two central processing unit (CPU)) microcontroller. In one embodiment, one core of the dual core microcontroller 110 runs all BLUETOOTH LOW ENERGY-related logic, while the second core is used for application logic. This dual core is particularly advantageous for preventing just the BLE stack from preventing the microcontroller from being able to carry out other important application logic. In one embodiment, the at least one microcontroller 110 is configured for near field communication (NFC) pairing. NFC pairing is advantageous as it follows for greater security in the BLUETOOTH connection, as it follows encryption keys to be shared over the NFC. Additionally, NFC is advantageous in pairing with specific devices when multiple available devices are located nearby. In one embodiment, the at least one microcontroller 110 includes Universal Serial Bus (USB) interoperability, allowing the device to connect via USB without requiring an additional chip. In one embodiment, the at least one microcontroller 110 includes at least one nRF5340 microcontroller.

In one embodiment, the network node device includes at least one port for connecting to an external power source. In one embodiment, the at least one port includes at least one Universal Serial Bus Type-C (USB-C) port 102, but one of ordinary skill in the art will understand that the at least one port is able to include any type of power enabling port known in the prior art. In one embodiment, the network node device includes at least one external antenna port operable to connect to at least one external data, useful, for example, for extending the range of the network node device.

In one embodiment, the network node device includes at least one chip 108 operable to communicate with at least one global navigation satellite system (GNSS) in order to generate position data for the network node device. In one embodiment, the at least one GNSS includes the global positioning system (GPS). In one embodiment, the at least one GPS chip 108 is able to transmit a precise signal to the at least one microcontroller 110, wherein the precise signal is synchronized with the GPS time. This synchronization allows all nodes within the mesh network to be synchronized simultaneously (within nanoseconds). In one embodiment, this simultaneous synchronization allows the system to utilize time division multiple access (TDMA) in order to modulate signals over the mesh network. In one embodiment, the at least one GPS chip 108 includes at least one odometer, operable to measure traveled distance by the at least one network node device. In one embodiment, the at least one GPS chip 108 within the network node device includes at least one MAX-M10 chip. In one embodiment, the at least one network node device includes at least one external flash memory unit. In one embodiment, the at least one external flash memory unit includes at least 16 mega bytes of memory. In one embodiment, the at least one external flash memory unit is in communication with the at least one GPS chip 108 and/or the at least one microcontroller 110 and is operable to store data regarding previously logged coordinates locations by the at least one GPS chip 108 over a period of time. In one embodiment, the network node device 100 also includes at least one satellite chip 112 for two-way communication with at least one satellite network.

In one embodiment, the network node device includes an internal inertial measurement unit (IMU). In one embodiment, the IMU includes at least one accelerometer and at least one gyroscope. In one embodiment, the at least one accelerometer is a 3-axis accelerometer and the at least one gyroscope is a 3-axis gyroscope.

Figure 2:
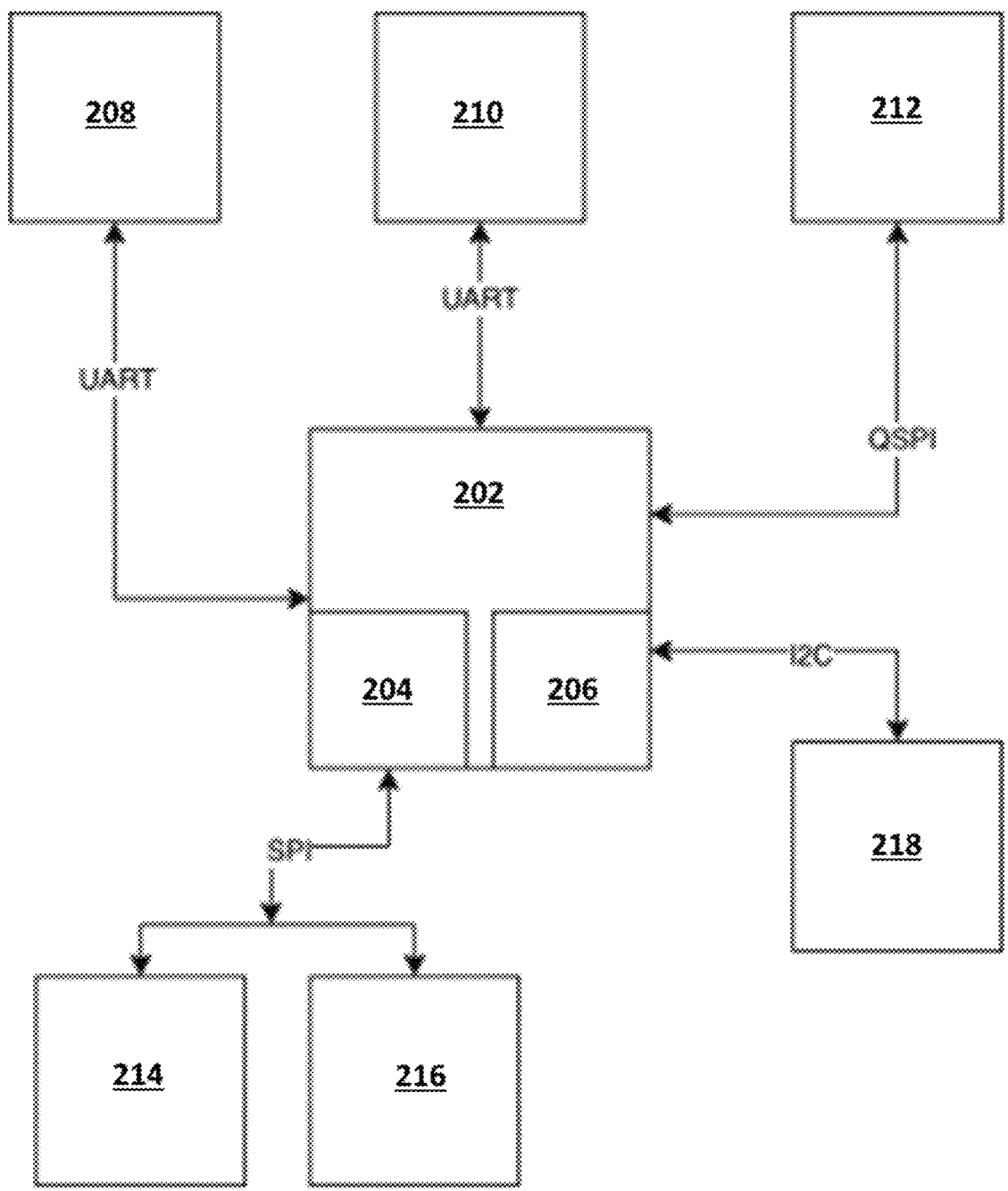
FIG. 2 is a schematic diagram showing connections between components of a network node device according to one embodiment of the present invention.

FIG. 2 is a schematic diagram showing connections between components of a network node device according to one embodiment of the present invention. In one embodiment, the network node device includes a microcontroller 202 including a first core 204 and a second core 206. In one embodiment, the microcontroller 202 is connected to at least one GPS chip 208 via a universal asynchronous receiver/transmitter (UART) protocol. In one embodiment, the microcontroller 202 is connected to at least one satellite communication module 210 via a UART protocol. In one embodiment, the microcontroller 202 is operable to communicate with and store information on at least one external flash memory 212. In one embodiment, the microcontroller 202 communicates data with the at least one external flash memory 212 via a Quad Serial Peripheral Interface (QSPI). In one embodiment, the microcontroller 202 is connected with a first LoRa radio 214 and a second LoRa radio 216 via a Serial Peripheral Interface (SPI). In one embodiment, the microcontroller 202 communicates data with at least one IMU 218 via an Inter-Integrated Circuit (I2C) port.

In one embodiment, a plurality of network node devices, each connected to at least one user device (e.g., a cell phone, a radio, at least one remote sensor, at least one device including an android team awareness kit (ATAK) application, node devices, etc.), are configured to form a mesh network. Examples of network node devices able to form part of the mesh network include the device shown and described with reference to FIGS. 1A-1D and additionally include routers, modems, beacons, and/or individual user devices connected to the mesh network. Preferably, devices forming the mesh network include those having backhaul capabilities, such that each device constituting the mesh network is able to serve as a backhaul.

In order to connect with external networks, the network node devices connect with external nodes. Such external nodes are able to include those routers, modems, beacons, radio towers, satellites, and/or other network enabled devices that form part of a network outside of the mesh network, including networks of the same type (e.g., other BLUETOOTH LOW ENERGY networks) or a different type as the mesh network. The mesh network allows two-way transmission of signals between the devices within the network, and allows signals to be sent to specific devices within the network (e.g., a central command base) by a device that is not within range of the specific devices, but in range of other devices (e.g., other devices, intermediate nodes, etc.). within the same network. This allows for cross-sharing of data between all devices in the network in a way that is particularly useful for coordinating activities in remote regions, especially for military applications.

In one embodiment, the system includes two separate, independent mesh networks, A and B. Devices within mesh network A are able to communicate with devices in mesh network B via at least one external network (e.g., cellular network, satellite network, etc.). The system therefore allows interoperability between discrete mesh network, even if those mesh networks are located in different geographical areas.

In one embodiment, the system is operable to automatically downgrade types of data transmitted over the network if sufficient signal strength and/or latency does not exist to transmit the data in a reasonable time frame (or at all), or if the available network exceeds other maximum parameters of the system (e.g., a maximum cost). In one embodiment, the system receives a required time sensitivity for one or more messages transmitted from a transmitting user device over the network. In one embodiment, required time sensitivities include immediate or real time, near real time (e.g., within one minute, within five minutes, within fifteen minutes, etc.), and/or one or more specific time durations (e.g., 30 minutes, one hour, five hours, etc.). Based on the selected time sensitivity, the strength of available networks, and the size of the file being transmitted, the network is able to choose the degree to which the signal must be transformed or reformatted into a smaller size file, if at all.

In one embodiment, the one or more messages include at least one video file. In one embodiment, a first level of transformation or reformatting for the at least one video file includes decreasing a resolution of the at least one video file. For example, the at least one video file is shared at a 480p resolution rather than at a 720p or 1080p resolution as originally recorded. In one embodiment, a second level of transformation or reformatting for at least one video file includes automatically selecting one or more still images from the video and transmitting the still image files in lieu of the video file. In one embodiment, the one or more still images from the video file are selected by the transmitting user device after the transmitting user device is informed regarding the level of transformation or reformatting that will be fused. In another embodiment, the one or more still images from the video file are automatically selected (e.g., the first image in the video file, the final image in the video file, one or more random images from the video file, etc.). In one embodiment, automatic selection of the one or more still images is performed by at least one artificial intelligence (AI)-based transformation module on the at least one network node device and/or included in a software application on the at least one transmitting user device. In one embodiment, the AI-based transformation module is a component of a backend application forming part of the system. In one embodiment, a third level of transformation or reformatting for at least one video file includes only transmitting metadata associated with the at least one video file. In one embodiment, metadata for the at least one video file includes a geolocation the video file was transferred from, a device the video file was transferred from, a time when the video file was transmitted, a geolocation the video file was first taken from, a device that first recorded the video file, a time when the video file was first generated, and/or any other identifying information for the video file. In one embodiment, if the video file is transformed to a third level and only metadata is transmitted, the system automatically matches the geolocation where the video file was initially generated with one or more online videos or images or videos or images within a predetermined database having the same or similar associated geolocation metadata and displays the matched video files and/or image files on a receiving user device.

In one embodiment, the one or more messages include at least one map file. Often map files, such as Keyhole Markup Language (KML) files, are not constructed initially to optimize size of the file and include extremely high detail in order to determine a fire line, for example, in the event of a forest fire. However, the high complexity and large size of these files is not always practical to send given the available network. In one embodiment, a first level of transformation or reformatting for the at least map file includes a version of the at least one map file with labeling of one or more locations on the map (e.g., road names, town names, river names, mountain names, etc.) automatically stripped to slightly decrease the size of the file. In one embodiment, a second level of transformation or reformatting for the at least one map file includes only a limited radius of the at least one map file (e.g., a 10 mile radius, a 5 mile radius, a 1 mile radius, etc.). In one embodiment, the system automatically limits the radius of the at least one map file until the size of the file is beneath a maximum threshold. In one embodiment, the system includes a minimum radius, below which the map size will not be reduced, opting to instead either sent a map file having at least the minimum radius or further transforming or reformatting the at least one map file in alternative manners. In one embodiment, if the at least one map file includes a series of polygons constructing a two-dimensional (2D) or three-dimensional (3D) terrain map, then a third level of transformation or reformatting includes the system automatically reducing the number and/or complexity of the polygons used in the terrain map in order to reduce the size of the file. In one embodiment, a fourth level of transformation or reformatting includes only sending one or more geospatial coordinates indicated on a map (e.g., a geospatial coordinate of the transmitting network node device, geospatial coordinates of other objects, previously visited geospatial coordinates of the transmitting network node device, etc.).

In one embodiment, the sequence of dealing with each type of file (e.g., video files, map files, etc.) is preprogrammed onto the network node device and/or another component of the system such that it occurs automatically when a particular type of file is attempted to be sent given parameters of a present network connection. However, one difficulty with this method is with dealing with new file types, as the range of possible file types is both very large and also not static, such hard coding particular methods of dealing with each type of file is often not practical. In order to account for this, in one embodiment, the system includes at least one artificial intelligence (AI)-based file transformation module operable to determine how to optimally decrease the size of each data message, including for new types of files. In one embodiment, the at least one AI-based file transformation module is included as a module within the at least one network node device. In another embodiment, the at least one AI-based file transformation module operates as part of a software application on the at least one user device. In one embodiment, the at least one AI-based file transformation module operates as part of a backend, or server-side, software application that forms part of the system.

In one embodiment, one or more network node devices within the mesh network store a local version of a queue for all messages intended to be transmitted from the mesh network via an external network (e.g., a satellite network). In another embodiment, one or more network node devices each store a local version of a queue for all messages intended to be transmitted from that particular network node device via the external network. In one embodiment, the network node devices push each message individually to the external network, rather than generating a queue at the external side. In this way, the system prevents an issue where one or more of the network node devices push several messages to a first external network, enter the range of a faster second external network and send several of those messages quicker, and then exit the range of the faster second external network with some of the messages in the first external network's queue already sent and some still unsent. Rather than having the system resend some of those messages with the slower external network or wiping all messages from the queue of the slower external network, this system allows the queue to work dynamically and adapt to present network conditions.

In one embodiment, the system initially transmits the transformed or reformatted version of the file via the network and delays, but does not cancel sending the full version of the file. When the device is in a location where the file is able to be fully transmitted, the file is transmitted without transformation or with a lesser degree of transformation to replace the earlier sent transformed version of the file.

Figure 3:
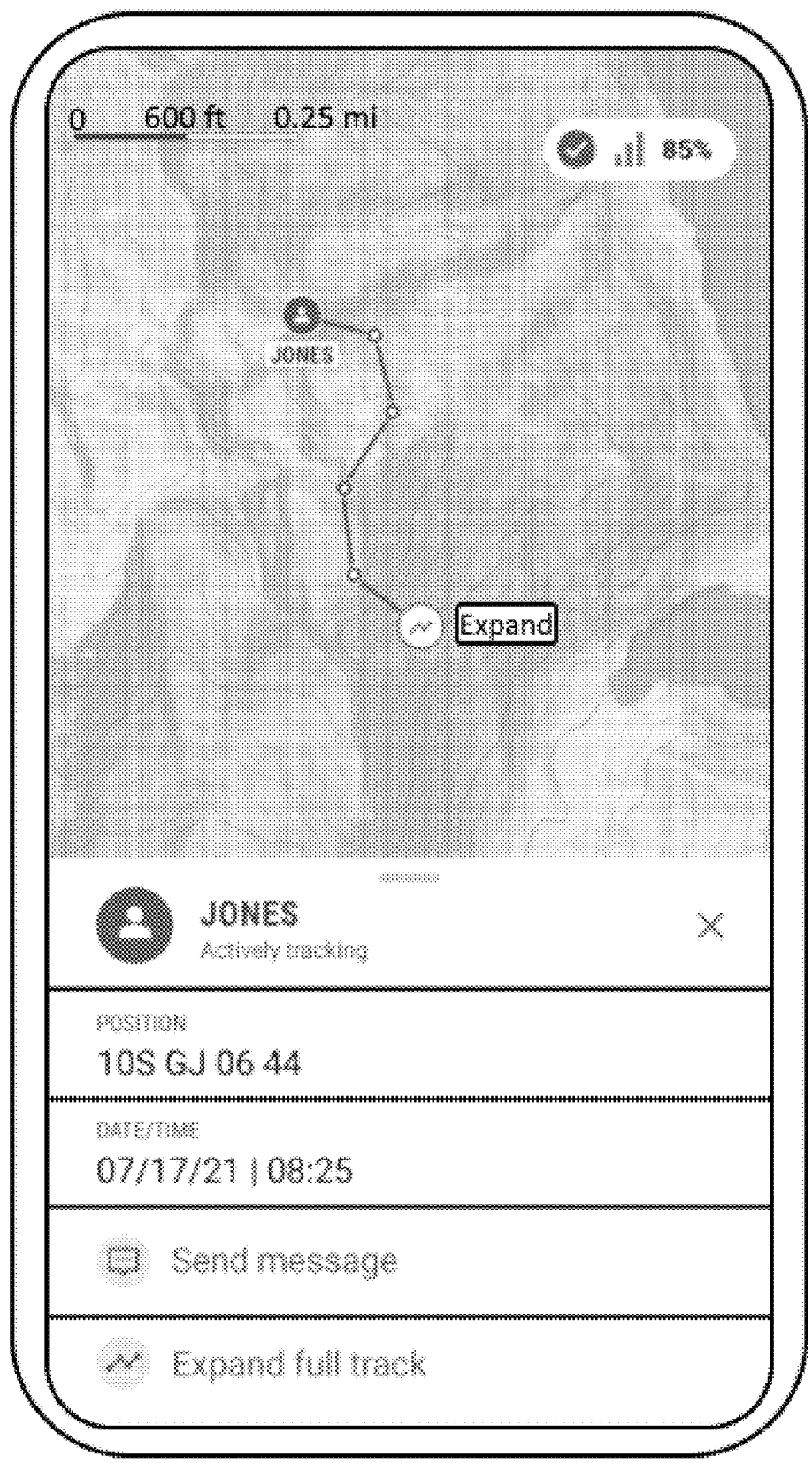
FIG. 3 illustrates a mobile app interface for identifying the location of an individual using a mesh network according to one embodiment of the present invention.

FIG. 3 illustrates a mobile app interface for identifying the location of an individual associated with a network node device according to one embodiment of the present invention. In one embodiment, the signals transmitted through the present system include geolocation data for at least one user device (or at least one network node device). The geolocation data for the at least one user device is indicated on at least one map interface of a software application able to receive data through the present system. In one embodiment, the at least one map interface receives geolocation data at regular intervals (e.g., in real time, every second, every 5 seconds, every 30 seconds, every minute, every five minutes, etc.) and automatically maintains a log (or track) indicating the previous geolocations received for the at least one user device in relation to the current geolocation of the at least one user device. In one embodiment, the frequency with which geolocation signals are transmitted according to the present invention depends on the network being used (e.g., satellite transmits every 5 seconds, while a wireless mesh network or cellular network transmits every second).

In one embodiment, the geolocation data is overlaid on an elevation map, a simple terrain map, a topographical map, and/or any other type of map. In one embodiment, the at least one map interface is operable to display actual geolocation coordinates. In one embodiment, the at least one map interface is operable to display a timestamp and/or a date stamp when the most recent coordinates were received by the at least one map interface. In one embodiment, the at least one map interface is operable to display an associated name registered with the at least one user device. In one embodiment, the at least one map interface only displays a portion of the path of the at least one user interface (e.g., the most recent 5 locations, the most recent 20 locations, the most recent 50 locations, etc.). In one embodiment, the at least one map interface is operable to receive a command to expand the amount of the path displayed and/or to show the full path of the at least one user device. In one embodiment, through the at least one map interface, the platform is able to receive a message transmittal request from at least one tracking user device and send a message associated with the request to at least one tracked user device.

Figure 4:
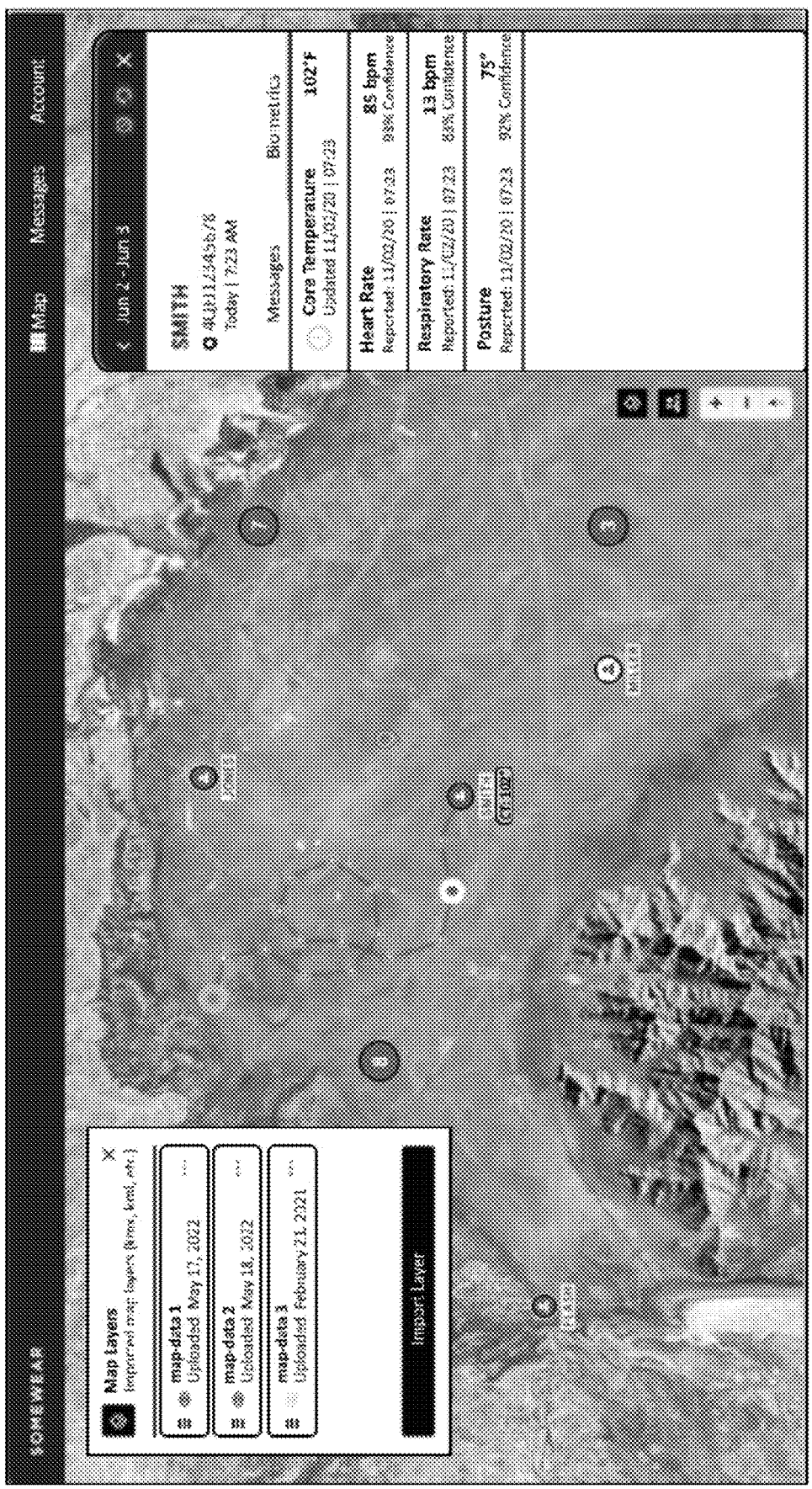
FIG. 4 illustrates a web interface for monitoring and tracking one or more individuals using a mesh network according to one embodiment of the present invention.

FIG. 4 illustrates a web interface for monitoring and tracking one or more individuals using a mesh network according to one embodiment of the present invention. Similar to the mobile interface shown in FIG. 3, the web interface shown in FIG. 4 allows for received geolocation coordinates of a user device to be displayed and overlaid on a map of an area. In one embodiment, more than one map layer is able to be overlaid on the at least one map interface. Examples of different map layers include, but are not limited to, topographical elevation maps, political map views (e.g., denoting political boundaries between nations or sub-national jurisdictions), natural terrain views, water reservoir views (e.g., highlighting the location of aquifers and other natural water sources), and/or any other type of map view. In another embodiment, different map layers include the same type of view, but with data gathered at different time periods, allowing one to visualize changes in the terrain. Furthermore, in one embodiment, the system receives data from one or more sensors within the mesh network. Sensors include, but are not limited to, heart rate sensors (e.g., electrocardiogram sensors), electromyogram sensors, heart rate variability sensors, blood pressure sensors, respiration rate sensors, galvanic skin sensors, posture sensors (e.g., accelerometers operable to detect the relative orientation of a person to which they are attached), electroencephalogram (EEG) sensors, body temperature sensors, oxygen saturation sensors (e.g., pulse oximeters), analyte sensors (e.g., blood glucose sensors), and/or other types of medical sensors. Other examples of sensors able to communicate data to the system include, but are not limited to, humidity sensors, light sensors, environmental temperature sensors, air pressure sensors, and/or other types of sensors. These sensors are able to communicate in real time, at regular intervals (e.g., 5 minutes, 30 minutes, one day, etc.), or upon request by another device in network communication with each sensor. In one embodiment, the sensors are attached to a tracked individual, embedded in a tracked user device, and/or otherwise placed so as to communicate with the mesh network. In one embodiment, the at least one map interface shows the last time period when each different type of sensor last communicated data and what the latest communicated data value was. In one embodiment, the at least one map interface includes an uncertainty value for one or more of the sensors communicating sensor data through the network.

In one embodiment, the graphical user interface (GUI) of a software application on at least one user device corresponding to the network node device includes a network connectivity display interface. The network connectivity display interface indicates the status of other network node devices within the mesh network, indicating whether a particular network node device is able to connect to each of the other network node devices. In one embodiment, the network connectivity display interface includes a list of external networks to which each network node device is able to connect, whether each network node device is connected to an external network, and/or to which external network each network node device is currently connected. In one embodiment, each network node device within the mesh network periodically transmits signals of the other network devices at predefined intervals (e.g., every second, every five seconds, every 30 seconds, every minute, every ten minutes, etc.) in order to determine connectivity status.

Figure 5:
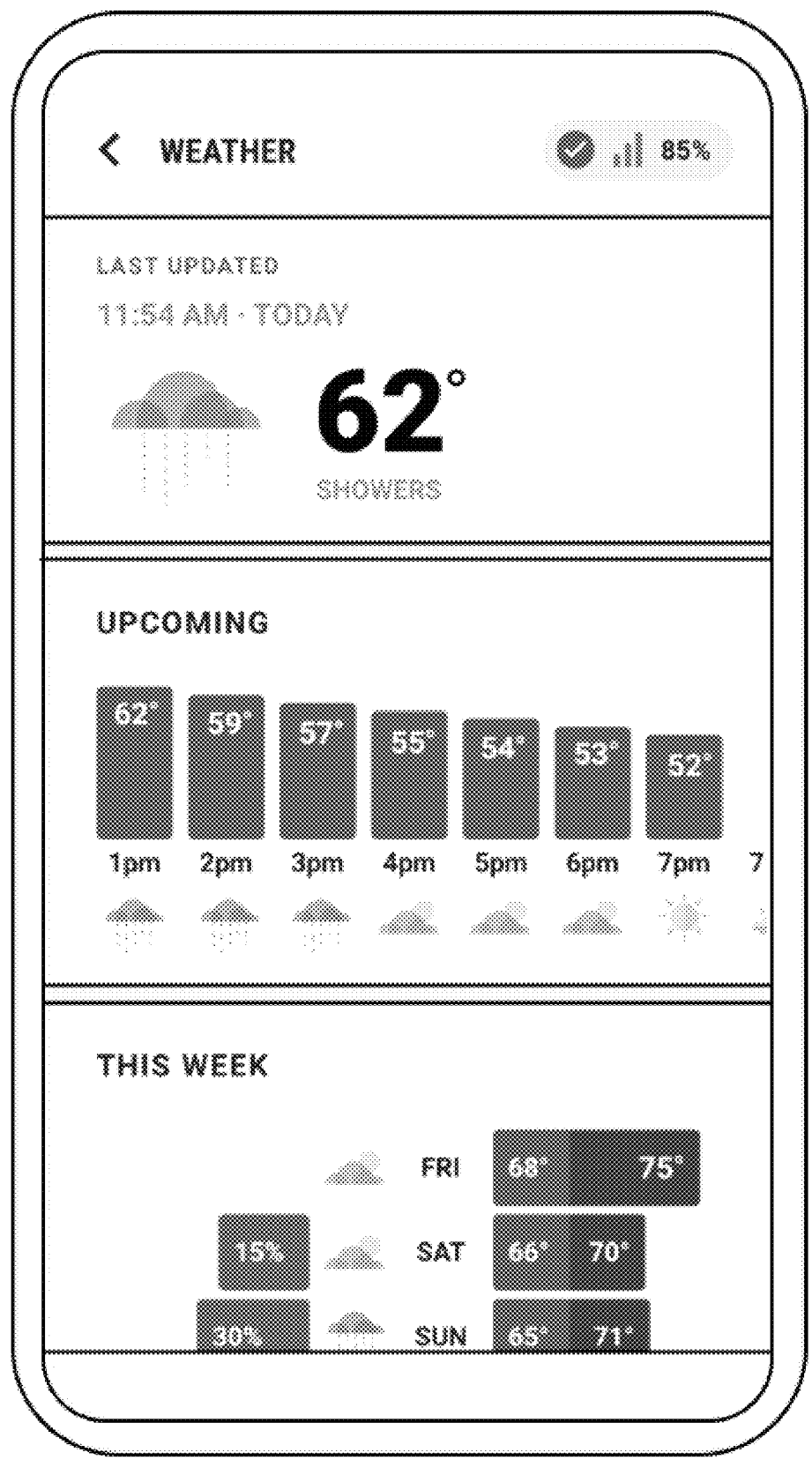
FIG. 5 illustrates an integrated weather interface for a mesh network tracking system according to one embodiment of the present invention.

FIG. 5 illustrates an integrated weather interface for a mesh network tracking system according to one embodiment of the present invention. In one embodiment, the mesh network tracking system is operable to receive weather data (e.g., projected temperature, precipitation, humidity, etc.) from at least one weather reporting service and automatically transmit the weather data to one or more user devices within the mesh network. In one embodiment, the system is operable to automatically retrieve weather data corresponding to the geolocation of one or more tracked user devices within the system to present the most relevant weather information for individuals participating in the system.

In one embodiment, the present invention is operable to utilize chirp spread spectrum techniques, such as LoRa, in order to transmit signals within the mesh network. LoRa, when used in combination with BLUETOOTH LOW ENERGY (BLE), is able to greatly expand the range of the BLE network, up to at least one 10 miles, beyond only a few meters, such as is the case with, for example, the SENTRIUS RM1xx. Chirp spread spectrum techniques are digital spread spectrum techniques that utilize wideband chirp pulses to encode bits of information. The chirp pulses include rising or falling frequency signals, where the rate at which the frequency rises or falls or the bandwidth of the chirps are able to be modified to encode different bits. LoRa is a particular technique utilizing chirp spread spectrum that enables long range transmission at notably low power levels, with spreading factors typically between 5 and 12. LoRa signals have a specific packet structure including a preamble, a header, a payload, and optionally a cyclic redundancy check (CRC) field. The preamble typically includes a single byte or other short repeated sequence that allows network nodes to learn they are picking up a new signal (given the otherwise very low probability of a repeating signal). Furthermore, LoRa preambles tend to be standardized, meaning that not only are network nodes able to detect that a new packet is incoming, but it is also able to synchronize with the packet by aligning the phase at which the packets are read with the expected, standardized phase of the preamble. The header is not always included, but is able to encode the length of the packet and/or the coding rate for the remainder of the frame.

The payload includes the information intended to be communicated in each packet. In one embodiment, the payload is between about 2 bytes and about 255 bytes for each payload. In a preferred embodiment, the payload includes a header, including unique code of the network node device that generated the data packet, a unique code for the destination node for the packet, a unique code for the node where the packet is coming from, a unique code for the next node that will receive the packet, a unique sequence number for the source network node device, a sum of received signal strength indicator (RSSI) values for the packet across the route, a number of necessary jumps between source and destination for the packet, a time to live (TTL) for the packet, and/or a designation whether the sending node includes backhaul capabilities. In other embodiments, the header is able to include a Media Access Control (MAC) header, indicating a frame type, a protocol version, and/or a direction (uplink or downlink). In one embodiment, the packet includes one or more CRC bytes appended to the end of the packet. Reading of the CRC bytes allows the receiver to check whether the packet is valid or if it will be rejected based on comparison to an expected CRC or comparison to other received packets. This enables the system to reject rogue packets and to ensure that packets are read correctly by the receiver. In another embodiment, the packets do not include a CRC. Examples of LoRa-based communication systems compatible with the present invention include, but are not limited to, U.S. Pat. No. 9,647,718, which is incorporated herein by reference in its entirety.

In one embodiment, each network node device within the mesh network holds a routing table with entries, indexed by node address, for destination address, which intermediate nodes are to be used (if any), distance to destination nodes, average signal strength for a path, last time each entry was updated, and/or whether nodes are eligible for backhaul. Each time a packet is received, each node updates the routing table and checks the header of the packet to determine what to do with the packet. If the destination address is the special broadcast address, then all nodes ingest the packet and re-transmit it in order to flood the mesh network. If the destination address is not the special broadcast address and is not equal to the receiving node's own address, then the network node device checks the routing table to determine which node should receive the packet next. If no known path is set, then the next node is automatically set to the special broadcast address and retransmitted so that any other nodes in range are able to receive the packet. In one embodiment, each time a network node device receives the packet, the distance field in the header of the packet is incremented by one and the TTL field is decremented by one, which continues until the packet reaches the destination node or until the TTL field is equal to zero. Additionally, in one embodiment, the node adds a received RSSI value to the running RSSI count in the header of the packet.

LoRa is an unusual spectrum spread system with regard to how resistant the transferred signals are to the ambient noise and therefore how well receivers are able to receive and accurately interpret signals transferred through LoRa even in noisy channels. With most spread spectrum techniques, such as direct sequence spread spectrum (DSSS) or frequency shift keying (FSK), the signal is undetectable below the noise floor (i.e., when the signal-to-noise ratio (SNR) is at or less than 0). At these levels, with other techniques, the signal is unable to be effectively deciphered, as the noise causes frequent misinterpretation. LoRa, however, demonstrates surprising resilience even at SNRs of about −20 dB, meaning situations where is the noise levels are much greater than the signal power.

Frequently, the benefit of LoRa's resilience is the ability to be able to transmit in noisy environments, but an unexpected additional benefit is the ability to specifically target channels or wavelengths with the highest noise and transmit the signal over that channel or wavelength. While the signal will still likely be detected among high ambient noise, a cursory look at the wavelength will likely not suggest that a signal is being transmitted at all, improving the security and decreasing the detectability of the signal by potential eavesdropping sources. This ability to remain hidden under high noise levels is made even more useful in light of LoRa's range. Under ideal conditions (i.e., not an urban environment with greater sources of potential interference), with a node transmission power of 25 mW, LoRa is able to transmit over 7 km, or over an area of about 154 km'. However, according to the LoRa Alliance, the world record for LoRa-based transmission occurred over an enormous 766 km. Either way, a 7 km range provides ample distance for signal transmission, even in most off-grid environments. Communication over long distances, with the ability to hide in noise, makes the system particularly useful for battlefield purposes.

However, one of ordinary skill in the art will understand that chirp spread modulation and LoRa are not the only standards by which signals are able to be transmitted according to the present invention. For example, in one embodiment, frequency shift keying (FSK) is used to transmit image and/or video data. In one embodiment, different methods are used to transmit different types of payloads. For example, in one embodiment, FSK is used specifically to transmit video data and/or image data, while text data is transmitted using a different technique (e.g., chirp spread modulation).

In one embodiment, the system is operable to transmit an acknowledgement message or signal confirming that data packets were successfully delivered. In one embodiment, the acknowledgement message includes metadata indicating a time at which the data packets were received. In one embodiment, if the packets are transmitted over a cellular network, then a mobile client transmits the acknowledgement message or signal. In another embodiment, if the packets are transmitted over a mesh network, then a receiving node transmits the acknowledgement message or signal. In yet another embodiment, if the packets are transmitted over a satellite network, then the satellite work (e.g., IRIDIUM) transmits the acknowledgment message or signal. In one embodiment, the acknowledgement messages are used to train at least one AI-module within the system (e.g., an AI-based network switching module) in order to better determine in the future to which network the network node devices should connect based on whether that work successfully worked in the a past in a given set of conditions, the speed at which the network sent the messages, and/or any other potential issues in using the network (e.g., individual packets dropped).

In one embodiment, the signals are transmitted over one or more of the industrial, scientific, and medical (ISM) bands. The ISM bands are specifically reserved for transmissions in the same fields, rather than in general telecommunications, and are therefore used for devices such as microwave ovens and medical devices (e.g., diathermy machines). ISM bands include, but are not limited to, 6.765 MHz to 6.795 MHz, 13.553-13.567 MHz, 26.957-27.283 MHz, 40.66-40.7 MHz, 433.05 MHz-434.79 MHz, 863-870 MHz, 902-928 MHz, 2.4-2.5 GHz, 5.725-5.875 GHz, 24-24.25 GHz, 61-61.5 GHz, 122-123 GHz, and 244-246 GHz. However, while these frequencies are preferable for avoiding interference from other telecommunications, one of ordinary skill in the art will understand that the present system is capable of operating over any bands, having any range of bandwidths.

In one embodiment, the network node device and/or an application on a user device includes at least one artificial intelligence (AI)-based network switching module. The at least one AI-based network switching module is able to change which type of network, which specific network, which frequency, and/or which network node to which the network node device and/or the user device connects. In one embodiment, the AI-based network switching module is operable to change networks in real time or near-real time. In one embodiment, the at least one AI-based network switching module is a component of at least one server within the present system. In this embodiment, when a first network node device attempts to send a file to a destination device (either within the same mesh network or within a second mesh network), a message is sent to at least one server, indicating a file size, a connection strength with at least one external network (and/or with other network node devices in the mesh network), and/or the destination node. In one embodiment, the at least one server is able to detect not only the signal strength between the transmitting network node device and the external network, but also the signal strength between the receiving network node device and the external network. In this situation, the AI-based network switching module is able to automatically determine over which network or over which path the signals are sent based on the connectivity of both the transmitting and the receiving devices.

In one embodiment, the network node device includes or is connected to at least one spectrum analyzer and/or is in communication with at least one spectrum analyzer operable to determine amount of noise level in a plurality of transmission bands. In one embodiment, the network node device includes or is connected to at least one signal strength meter operable to measure power of one or more signal transmitters at the network node device. In one embodiment, the at least one signal strength meter is operable to utilize methods such as fine timing measurement (FTM) and/or received signal strength indication (RSSI) to determine signal strength between the network node device and one or more external networks. In one embodiment, the network node device is operable to utilize carrier-sense multiple access with collision avoidance (CSMA/CA) in order to periodically ping in order to determine if connections with specific networks are still available. In one embodiment, the network node device and/or a user device connected to the network node device is operable to store historical information regarding the noise levels along specific bands or in specific types of networks, correlated with location data for each reading and/or time data for each reading (e.g., noise levels at specific times of day, on specific days of week, at specific times of the year, etc.). In one embodiment, the network node and/or a user device connected to the network node device is operable to store historical information regarding signal strength with one or more different network nodes correlated with location data for each reading and/or time data for each reading (e.g., signal strength with node 1 at specific times of day, on specific days of week, at specific times of the year, etc.). In one embodiment, the network node device and/or a user device connected to the network node device is operable to store historical information regarding latency (or ping) with one or more different network nodes correlated with location data for each reading and/or time data for each reading (e.g., latency in connecting with node 1 at specific times of day, on specific days of week, at specific times of the year, etc.).

In one embodiment, based on live readings of latency, noise level, and/or signal strength with one or more network nodes, or based on historical data of latency, noise level, and/or signal strength for the one or more network nodes, the at least one artificial intelligence (AI)-based network switching module automatically connects the network node device to an optimal network type (e.g., WI-FI vs. cellular vs.

satellite), an optimal frequency band, and/or an optimal network node (e.g., a specific receiver within a network). In another embodiment, cost of sending data over a network is used as a factor in determining which network to send data over. In one embodiment, the cost of transmitting the data over a particular network is calculated in real-time based on the total amount of data being transferred and a known cost to use a particular network per unit of data. In one embodiment, the cost is compared to one or more threshold preferences within the network, indicating, for example, a maximum amount of total money to be spent per message, per unit of data, and/or overall in order to determine which network to use to transmit particular messages. Using the AI-based network switching module to select optimal network nodes to connect to is useful in selecting a shortest or strongest path (or a path maximizing any other intended attribute) between a transmitting device and an intended receiving device, whether within or outside of the mesh network. In one embodiment, what is defined as the optimal network type is based off preference information stored on the network node device. For example, if the preference is for optimal connection speed, then the system will attempt to minimize latency, with decreased focus on signal strength and noise level. If the preference is to minimize the likelihood of signal confusion or transmission failure, then the system will attempt to maximize signal strength while minimizing noise level, with less selectivity for latency. However, preference data is frequently not a monotonic focus on any one goal, and, more likely, the preference data adjusts relative weighting on noise level, signal strength, and latency, rather than entirely focusing on one or eliminating another.

In one embodiment, the preference data indicates a secrecy requirement for the transmission of one or more data packets. In one embodiment, in order to satisfy the secrecy requirement, the at least one AI-based network switching module automatically selects one or more types of networks, specific network frequencies, and/or network nodes over which there is above a minimum threshold of noise, but below a maximum threshold of noise (e.g., based on spectrum analysis data and/or historical data for each network, frequency, etc.). In one embodiment, the minimum threshold of noise is selected such that the signal-to-noise ratio (SNR) is less than approximately 0 dB. In one embodiment, the minimum threshold of noise is selected such that the SNR is less than approximately −10 dB. In one embodiment, the minimum threshold of noise is selected such that the SNR is less than approximately −20 dB. This strategy of specifically looking for networks with a minimum level of noise, especially where the SNR is less than 0, is directly contradictory to prior art signal transmission schemes, as, with most forms of transmission, this scheme will likely result in the data being unable to be accurately reconstructed by the receiver. However, because the present system leverages chirp spread spectrum (e.g., LoRa), the system is able to better ensure that the signal is still readable while hiding the signal among high noise.

In one embodiment, which network is used to transmit packets is determined based on the type of data being transferred. For example, for larger file types (e.g., images and videos) are transmitted over a cellular network or a mesh wireless network, while smaller file types (e.g., simple text, raw metadata, etc.) are transmitted over a network such as low bandwidth radiofrequency or satellite communication. In another embodiment, which networks are used are determined based on preference data of the transmitting user device. For example, in one embodiment, the transmitting user device specifically designates messages be transmitted over low bandwidth radiofrequency networks or blacklists a particular wireless mesh network. Thus, the system is able to specifically utilize or specifically avoid (i.e., via a blacklist) specific networks. In one embodiment, the AI-based network switching module incorporates the relative financial cost of using each network in order to determine over which network to transmit the data packets.

In one embodiment, which network to which a particular network node device connects is based, at least in part, on the connectivity statuses of other network node devices within the same mesh network. In this way, for example, the mesh network is able to self-organize to ensure that a maximum number of devices are connected to the same network, such that a single message is able to be split and received by a larger number of network node devices within the network and later reconstructed, minimizing the size of the package delivered to each network node device. In another embodiment, the network to which each network node device connects is based, at least in part, on the amount of power required to transmit messages over each network and/or an amount of remaining power for the network node device. For example, if the network node device has a power level below a preset threshold, then the network node device will automatically prioritize a low power draw network (e.g., will prioritize BLE communications over usage of a cellular or satellite network).

In one embodiment, the network node device is in communication with at least one movement mechanism able to adjust the positioning of the network node device to optimize connectivity to a broader network. For example, in one embodiment, the network node device is attached to and in network communication with at least one unmanned aerial vehicle. The network node device is able to receive signal strength, noise level, and/or latency readings from a plurality of different heights and lateral positions and transmit commands to the unmanned aerial vehicle to relocate in a position where an optimal combination of signal strength, noise level, and/or latency is present (e.g., relocate where signal strength is optimal between both the at least one user device and the broader network). In one embodiment, this is able to help individual users that need to optimize their abilities to transmit signals where the unmanned aerial vehicle helps to avoid natural boundaries or reach heights not achievable by the individual themselves. In another embodiment, the unmanned aerial vehicles are set to move to locations where the signal in a relevant network (e.g., low bandwidth radio networks, cellular networks, etc.) has a strength below a minimum threshold and purposefully reposition there so as to extend the range of the network over a wider area. Multiple of these devices are then able to form a self-establishing chain of signal to provide coverage to remote regions. This system also has particular applicability to disaster-response scenarios, such as firefighting, which often knock out established networks, or larger scale natural disasters, such as earthquakes or fires that are able to wipe out the communication networks of entire cities or regions. One of ordinary skill in the art will understand that the unmanned aerial vehicle in this example is able to be replaced with a ground vehicle, aquatic vehicle, or semi-aquatic vehicle, as the situation requires.

In one embodiment, devices within the system are not identified with Internet Protocol (IP) numbers or the system does not utilize IP numbers in order to transmit messages over the networks. This is advantageous, as IP-based networks are more difficult to set up and have poor flexibility, due to the difficulty of changing the IP numbers. IP addresses are particularly configured for messages meant to be sent to millions of other devices via the internet, but the more limited mesh network of the present invention does not see sufficient advantage from such a feature and therefore the issue of additional power draw and packet size for IP-related communications outweigh potential benefits of using the addresses. Additionally, IP networks often require higher bandwidths and greater reliability (with notable problems when operating with low signal strengths) than are practical in remote areas or disaster scenarios.

In one embodiment, all messages sent within the mesh network are automatically encrypted, such that only the receiving device or only the network node devices within the network are able to decrypt the messages using private keys associated with each device (or associated with the network as a whole).

The AI-based network switching module is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AI-based network switching module is operable to use any of the aforementioned learning techniques alone or in combination.

Further, the AI-based network switching module is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AI-based network switching module is preferably operable to recommend and/or perform actions based on historical data, external data sources, ML, AI, NNs, and/or other learning techniques. The AI-based network switching module is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 6:
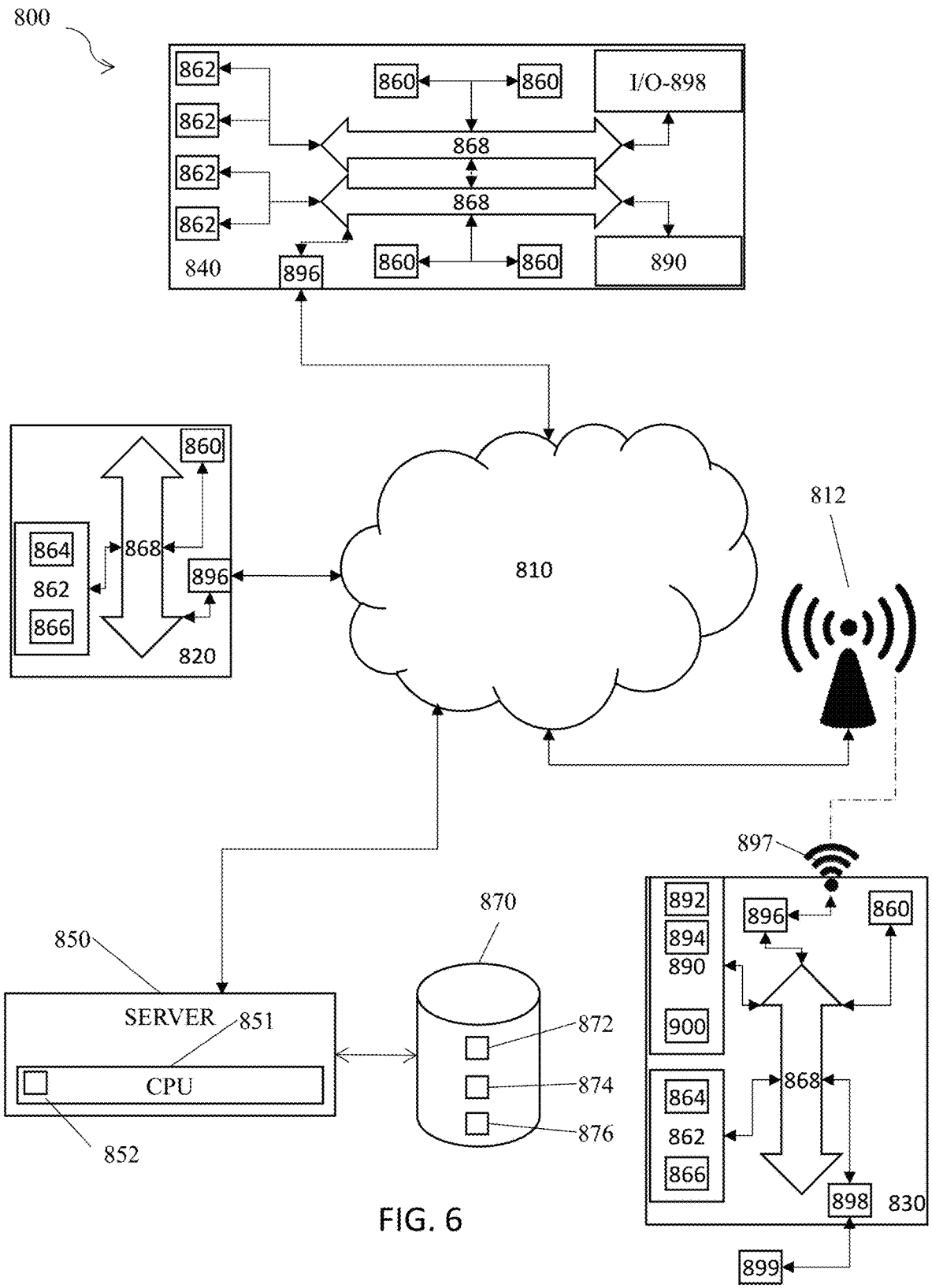
FIG. 6 is a schematic diagram of a system of the present invention.

FIG. 6 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 6, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6, or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for communicating data over one or more networks, comprising:
   a plurality of network node devices in continuous communication with each other and constituting a mesh network;
   wherein each of the plurality of network node devices is operable to continuously communicate with other network node devices using chirp spread spectrum-based communication;
   wherein the mesh network receives at least one data package from an external network;
   wherein the at least one data package is automatically split into a plurality of portions, wherein each of the plurality of portions is transmitted to a separate network node device within the mesh network;
   wherein at least one of the plurality of network node devices in the mesh network reconstructs the at least one data package after receiving the plurality of portions from other network devices within the mesh network;
   wherein one of the plurality of network node devices is operable to transmit only at least one set of metadata derived from the at least one data package when a signal strength with the external network is weaker than a preset threshold;
   wherein the one of the plurality of network node devices, after transmitting the at least one set of metadata, is operable to automatically transmit the at least one data package when the signal strength with the external network becomes stronger than the preset threshold;
   wherein more than one of the plurality of network node devices stores a local queue of all messages intended to be transmitted; and wherein the at least one set of metadata includes a geolocation of the one of the plurality of network node devices that transmitted the at least one data package, a device identifier for the one of the plurality of network node devices that transmitted the at least one data package, a time when the at least one data package was transmitted, a geolocation where the at least one data package was first generated, a device identifier for a device that first generated the at least one data package, and/or a time when the at least one data package was first generated.

2. The system of claim 1, wherein the plurality of network node devices each connect to at least one user device via BLUETOOTH LOW ENERGY connections.

3. The system of claim 1, wherein sizes of the plurality of portions split to the separate network node devices is determined based on signal strength, latency, available bandwidth, and/or noise level of connections between external network and each of the separate network node devices.

4. The system of claim 1, wherein the at least one network node device is attached to at least one unmanned aerial vehicle, wherein the at least one network node device is operable to receive signal strength, noise level, and/or latency readings from a plurality of positions, and send a command to the at least one unmanned aerial vehicle to relocate to a position of the at least one unmanned aerial vehicle for preferred signal strength, preferred noise level, and/or preferred latency readings.

5. The system of claim 1, wherein the radiofrequency-based communication is LoRa-based communication.

6. The system of claim 1, wherein the plurality of network node devices transform at least one data package exiting the mesh network to the external network from a first file type to a second file type, wherein the transformation is based on signal strength, latency, available bandwidth, cost, and/or power usage for transmitting to the external network.

7. The system of claim 1, wherein a network node device transmitting a video file to the external network automatically transforms the video file into a plurality of static images selected from the video file.

8. The system of claim 1, further comprising a graphical user interface (GUI) operable to display locations of the network node devices, wherein the locations of the network node devices are updated at least every five seconds.

9. A system for communicating data over one or more networks, comprising:
a plurality of network node devices in continuous communication with each other and constituting a mesh network;
wherein each of the plurality of network node devices is operable to continuously communicate with other network node devices using chirp spread spectrum-based communication;
wherein each of the plurality of network node devices are operable to communicate with at least one external network;
wherein each of the plurality of network node devices are operable to switch which of the at least one external network each of the plurality of network node devices is connected to based on noise levels in connections between each of the plurality of network node devices and each of the at least one external network;
wherein the at least one of the plurality of network node devices in the mesh network transmits at least one data package to the at least one external network;
wherein one of the plurality of network node devices is operable to transmit only at least one set of metadata derived from the at least one data package when a signal strength with the external network is weaker than a preset threshold;
wherein the one of the plurality of network node devices, after transmitting the at least one set of metadata, is operable to automatically transmit the at least one data package when the signal strength with the external network becomes stronger than the preset threshold;
wherein more than one of the plurality of network node devices stores a local queue of all messages intended to be transmitted;
wherein at least one of the plurality of network devices pushes each message of the all messages intended to be transmitted individually to the at least one external network and a queue is not generated at the at least one external network; and
wherein the at least one set of metadata includes a geolocation of the one of the plurality of network node devices that transmitted the at least one data package.

10. The system of claim 9, wherein the chirp spread spectrum-based communication is LoRa-based communication.

11. The system of claim 9, wherein the at least one network node device is operable to selectively transmit and/or receive data over one or more networks of the at least one network that has a noise power over a preset threshold.

12. The system of claim 9, wherein each of the plurality of network node devices are operable to switch to one of the at least one external network having the highest noise level, but where the noise level is lower than a preset maximum noise level.

13. The system of claim 9, wherein the at least one data package includes at least one map file, wherein the at least one the plurality of network node devices transforms the at least one map file, and wherein the transformation of the at least one map file decreases the file size of the at least one map file.

14. The system of claim 9, wherein each of the plurality of network node devices receives status update messages from each other network node device within the mesh network at preset time intervals.

15. A system for communicating data over one or more networks, comprising:
a plurality of network node devices in continuous communication with each other and constituting a mesh network;
wherein each of the plurality of network node devices is operable to continuously communicate with other network node devices using chirp spread spectrum-based communication;
wherein each of the plurality of network node devices are operable to communicate with at least one external network;
wherein at least one of the plurality of network node devices in the mesh network transmits at least one data package to the at least one external network;
wherein the at least one of the plurality of network node devices transforms the at least one data package from a first file type to a second file type, wherein the second file type has a lower file size than the first file type, and wherein the amount of file size reduction is based on signal strength, latency and/or available bandwidth cost between the at least one of the plurality of network node devices and the at least one external network;
wherein one of the plurality of network node devices is operable to transmit only at least one set of metadata derived from the at least one data package when a signal strength with the external network is weaker than a preset threshold;

wherein the one of the plurality of network node devices, after transmitting the at least one set of metadata, is operable to automatically transmit the at least one data package when the signal strength with the external network becomes stronger than the preset threshold;

wherein more than one of the plurality of network node devices stores a local queue of all messages intended to be transmitted; and wherein the at least one set of metadata includes a geolocation of the one of the plurality of network node devices that transmitted the at least one data package.

16. The system of claim 15, further comprising a graphical user interface (GUI) operable to display locations of the plurality of network node devices, wherein the locations of the plurality of network node devices are updated at a preset time interval.

17. The system of claim 15, wherein the at least one external network is selected based on a financial cost of transmitting the at least one data package via the at least one external network and/or an amount of power drawn from an internal battery of the at least one of the plurality of network node devices for transmitting the at least one data package via the at least one external network.

18. The system of claim 15, wherein the system is operable to automatically match the geolocation of the one of the plurality of network node devices that transmitted the at least one data package with a geolocation where video and/or image data from previous data packages were generated, wherein the system is operable to display the video and/or image data from the previous data packages associated with the same geolocation of the one of the plurality of network node devices that transmitted the data package on a receiving user device.

19. The system of claim 15, wherein the at least one of the plurality of network node devices in the mesh network does not utilize an Internet Protocol (IP) address to transmit the at least one data package to the at least one external network.

20. The system of claim 15, wherein at least one server, in real time, determines a first external network to which a transmitting network node device in the mesh network is connected and a server to which a receiving network node device in the mesh network is connected, and wherein at least one artificial intelligence (AI)-based network switching module of the at least one server determines a transmission path to transmit the at least one data package through one or more external networks.

* * * * *